United States Patent [19]

Eisele et al.

[11] Patent Number: 4,745,149
[45] Date of Patent: May 17, 1988

[54] THERMOPLASTIC ELASTOMERS

[75] Inventors: Ulrich Eisele, Leverkusen; Dieter Jache, Overath; Ludwig Mott, Leverkusen; Karl-Heinz Schabel, Burscheid, all of Fed. Rep. of Germany

[73] Assignee: Bayer Aktiengesellschaft, Leverkusen-Bayerwerk, Fed. Rep. of Germany

[21] Appl. No.: 902,701

[22] Filed: Sep. 2, 1986

[30] Foreign Application Priority Data

Sep. 11, 1985 [DE] Fed. Rep. of Germany ....... 3532357

[51] Int. Cl.⁴ .................. C08L 53/02; C08L 23/12; C08L 23/16
[52] U.S. Cl. ..................... 524/505; 524/518; 525/97; 525/98; 525/99
[58] Field of Search ............ 525/99, 98, 197, 97; 523/351, 206, 210; 524/505, 518

[56] References Cited

U.S. PATENT DOCUMENTS

| | | | |
|---|---|---|---|
| 3,793,283 | 2/1974 | Frailey et al. | 525/98 |
| 3,926,901 | 12/1975 | Boozer . | |
| 3,985,702 | 10/1976 | Himes | 525/197 |
| 4,132,698 | 1/1979 | Gessler et al. | 524/518 |
| 4,212,787 | 7/1980 | Matsuda et al. | 524/518 |
| 4,248,758 | 3/1981 | Wright | 525/97 |
| 4,272,431 | 6/1981 | Schepers . | |
| 4,454,092 | 6/1984 | Shimizu et al. | 525/197 |

FOREIGN PATENT DOCUMENTS 2320969  3/1977  France .
2365601  4/1978  France .

OTHER PUBLICATIONS

Holden et al., "Block & Graft Copolymerization", Chapter 6, pp. 133 & 171.

*Primary Examiner*—Carman J. Seccuro
*Attorney, Agent, or Firm*—Connolly & Hutz

[57] ABSTRACT

Thermoplastic elastomers made of 48 to 88% by weight of ethylene-propylene-diene-rubber (EPDM), 10 to 50% by weight of polypropylene (PP) and 2 to 20% by weight of a third polymer and 5 to 60% by weight of softening oil, based on the total of EPDM, PP and the third polymer, and optionally further conventional constituents, have the advantage that the softening oil does not exude.

5 Claims, No Drawings

THERMOPLASTIC ELASTOMERS

This invention relates to thermoplastic elastomers made of an ethylene-propylene-diene-rubber (EPDM), polypropylene (PP), a softening oil and at least one other constituent.

Thermoplastic elastomers made of EPDM and PP are known; their outstanding feature is a relatively high level of hardness and they are, for this reason, frequently blended with softening oil so as to be softer when set. Oil-extending thermoplastic elastomers made of EPDM and PP are also known, for example from EP-OS No. 52 469 and the other literature mentioned in that document.

The plasticizer, in general a naphthenic oil or paraffinic oil, has the disadvantage that it or a portion thereof slowly exudes out of the thermoplastic elastomer and/or out of the moulded articles made therefrom. This gives rise to an unpleasantly adhesive surface. It does not help to reduce the quantity of oil by the amount that is later exuded since oil continues to exude, albeit in smaller amounts.

Therefore there is a need for oil-extended thermoplastic elastomers in which the oil exudation is reduced to an acceptable level.

Suprisingly, it was found that this object could be achieved by the mixing of the polymer mixture of EPDM, PP and plasticizer with another polymer in a smaller quantity.

Mixtures made in accordance with the invention described herein contain 48 to 88% by weight of ethylene-propylene-diene-terpolymer, 10 to 50% by weight of polypropylene and 2 to 20% by weight of a third polymer. In addition such mixture contains 5 to 60% by weight of plasticizer, the percentages being based on the total of EPDM, PP and the third polymer and optionally further usual constituents, such as stabilizers, fillers etc.

In these mixtures the rubber components can be vulcanized.

For the vulcanization of the rubber components any vulcanization agents which are known from the static vulcanization of these products are suitable, such as sulfur compounds, phenolic resins, peroxides etc.

EPDM-rubbers with an ethylene/propylene weight ratio of from 80:20 to 40:60 and Mooney-viscosities (ML 1+4, 100° C.) of from 30 Mooney units (MU) to (ML 1+4, 140° C.) of 170 MU are suitable for application according to the invention. The EPDM contains 1 to 15% by weight of diene.

Preferably products with an ethylene/propylene ratio of from 70:30 to 50:50 are used.

The known isotactic polypropylenes and/or their copolymers with, for example, ethylene (at the most 6% by weight of the total quantity of monomer) and melt indices ($MFI_{230/2.16}$) of the products between 0.1 to 20 g/10 min, preferably between 1 and 13 g/10 min, are suitable as polypropylene.

Suitable third polymers which reduce the migration of oil are, for example, block copolymers made of at least two different blocks, A and B, in which A is preferably a polystyrene block and B preferably a block made of butadiene or isoprene, which can be subsequently hydrogenated partially or totally.

Preferred products have a styrene content of 10 to 40% by weight, of which at least 80% by weight are incorporated as block units. The viscosities of a 20% by weight solution of these products in toluene at 25° C. are to 1 to 2.5 Pa s.

Diblock and triblock polymers are preferred. The block copolymers, the ethylene-propylene-diene-terpolymers (in which dicyclopentadiene and ethylidene norbornene are suitable principally as diene components), and the polypropylene are known in the art.

Preferably, the polymer mixture contains 60 to 80% by weight of EPDM, 15 to 30% by weight of PP, 3 to 10% by weight of the third polymer and 10 to 40% by weight of plasticizer.

The claimed thermoplastic polymers can also contain usual constituents such as fillers, anti-oxidants, pigments and similar substances.

The claimed mixtures can be produced in any suitable device, for example, an internal mixer (Banbury mixer), an extruder mixer, or a transfer mixer.

EXAMPLE

In a two-liter Banbury mixer which has been heated up to 79° C. EPDM, polypropylene and optionally block copolymers and peroxide are mixed at 120 rpm for 1.5–2 mins. During this process the temperature increases to 170° C.

At this temperature the mixture is mixed for a further 2 minutes and then the quantity of oil stated and optionally a stabilizer are added. The mixture is mixed again until all the oil is incorporated (for approximately 3 mins). During the course of this period the temperature increases to 205° to 210° C. The batch is removed and drawn out on rollers which have been heated up to 170° C. to a sheet 4 mm thick. After this has cooled it is granulated in a cutting mill. Injection moulded plates of the size, 110 by 75 by 6 mm, are produced from the granular material, on which plates the oil migration is determined as follows:

Under standardized conditions the surface is washed with acetone and air-dried. Then the plate is tempered at 50° C. for 24 hours and then placed in acetone again and thus the film of oil is washed off. The acetone extract is evaporated to the point of dryness and the residue is calculated in mg per $cm^2$.

The results are represented in Table 1.

In this Table block polymer I is a butadiene-styrene-block copolymer of the A-B type with a content of 30% by weight of styrene, of which 24% by weight are a block component, and having a viscosity $\eta$ of 1.43 dl/g in toluene at 25° C.; block copolymer II is a butadiene-styrene-block polymer of the A-B-A type with a content of 28% by weight styrene, of which >25% by weight are a block component, and with a solution viscosity (25% by weight in toluene, 25° C.) of 1.2 Pa s; block copolymer III is a hydrogenated block copolymer II with a solution viscosity (25% by weight in toluene, 25° C.) of 1.2 Pa s; and block copolymer IV is a butadiene styrene block copolymer of the A-B-A type, segment B hydrogenated, with a styrene content of 14% by weight, of which more than 12% by weight are in blocks. The solution viscosity of IV (25% by weight in toluene, at 25° C.) was 1.3 Pa s.

B always signifies the butadiene (or hydrogenated butadiene) block.

The EPDM which was used consisted of 54% by weight of ethylene, 42.5% by weight of propylene and 3.5% by weight of dicyclopentadiene, and had a Mooney viscosity (ML 1+4, 100° C.) of 82 MU.

The polypropylene which was used had a melt index $MFI_{230/2.16}$ of 4 g/10 min.

TABLE 1

| Test | A Comp. | 1 | 2 | 3 | 4 | B Comp. | 5 | 6 | 7 |
|---|---|---|---|---|---|---|---|---|---|
| EPDM | 76 | 70 | 70 | 70 | 70 | 76 | 72 | 72 | 70 |
| Polypropylene | 24 | 22 | 22 | 22 | 22 | 24 | 24 | 24 | 22 |
| 2,5-Dimethyl-2,5-bis-(t-butylperoxy)-hexane | 0.25 | 0.25 | 0.25 | 0.25 | 0.25 | 0.25 | 0.25 | 0.25 | 0.25 |
| Block copolymer I | — | 8 | — | — | — | — | 4 | — | 8 |
| Block copolymer II | — | — | 8 | — | — | — | — | 4 | — |
| Block copolymer III | — | — | — | 8 | — | — | — | — | — |
| Block copolymer IV | — | — | — | — | 8 | — | — | — | — |
| Paraffin Oil | 20 | 20 | 20 | 20 | 20 | 30 | 30 | 30 | 30 |
| Oil Migration in mg per cm$^2$ | 1.35 | 0.25 | 0.40 | 0.45 | 0.50 | 1.50 | 0.52 | 0.50 | 0.35 |

We claim:

1. Thermoplastic elastomer containing a polymer mixture consisting essentially of
   (i) 48–88% by weight of ethylene-propylene-diene-rubber,
   10–50% by weight of polypropylene and
   2–20% by weight of a block-copolymer made of at least two blocks A and B, whereby block A is polystyrene and block B is polybutadiene or polyisoprene, and the polymer of block B is at least partially hydrogenated, and
   (ii) 5–60% by weight of a plasticizing oil with the percentages of component (ii) being based on the total of the components of (i).

2. Thermoplastic elastomers according to claim 1 wherein component (i) has 15–30% ethylene-propylene-diene-rubber, 15–30% polypropylene and 3–10% block-copolymer and component (ii) has an amount of 20–40%.

3. Thermoplastic elastomers according to claim 1, in which the ethylene-propylene-diene-rubber has an ethylene/propylene weight ratio of from 80:20 to 40:60, a Mooney viscosity (ML 1+4, 100° C.) of from 30 MU to (ML 1+4, 140° C.) of 170 MU and a diene content of from 1 to 15% by weight.

4. Thermoplastic elastomers according to claim 1, in which the polypropylene has a melt index MFI$_{230/2.16}$ of 0.1 to 20 g/10 min.

5. Thermoplastic elastomers according to claim 1, in which said block-copolymer has a styrene content of from 10 to 40% by weight of which at least 80% by weight is incorporated as block units, and a 20% by weight solution of which in toluene has viscosity of from 1 to 2.5 Pa s at 25° C.

* * * * *